(12) United States Patent
Schlicksbier et al.

(10) Patent No.: US 11,796,297 B2
(45) Date of Patent: Oct. 24, 2023

(54) POSITION-MEASURING DEVICE

(71) Applicant: DR. JOHANNES HEIDENHAIN GmbH, Traunreut (DE)

(72) Inventors: Thilo Schlicksbier, Traunstein (DE); Tarek Nutzinger, Vachendorf (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 155 days.

(21) Appl. No.: 17/224,133

(22) Filed: Apr. 7, 2021

(65) Prior Publication Data
US 2021/0341277 A1     Nov. 4, 2021

(30) Foreign Application Priority Data
Apr. 29, 2020 (EP) ..................................... 20171972

(51) Int. Cl.
    *G01B 5/02*        (2006.01)
    *G01D 5/244*      (2006.01)
    *G01B 5/00*        (2006.01)

(52) U.S. Cl.
    CPC .............. *G01B 5/02* (2013.01); *G01B 5/0014* (2013.01); *G01D 5/24442* (2013.01)

(58) Field of Classification Search
    CPC ..... G01B 5/02; G01B 5/0014; G01D 5/24442
    See application file for complete search history.

(56) References Cited

U.S. PATENT DOCUMENTS

| | | | | |
|---|---|---|---|---|
| 4,170,829 A | * | 10/1979 | Nelle | G01B 5/0009 33/702 |
| 4,320,578 A | * | 3/1982 | Ernst | G01B 5/0014 33/484 |
| 4,982,508 A | | 1/1991 | Nelle et al. | |
| 5,079,850 A | * | 1/1992 | Rieder | G01D 5/34761 33/705 |
| 8,448,347 B2 | * | 5/2013 | Affa | G01D 5/34715 33/702 |
| 8,997,367 B2 | * | 4/2015 | Schmoller | G01D 5/34761 33/706 |
| 9,234,734 B2 | * | 1/2016 | Schmöller | G01D 5/34769 |
| 10,077,841 B2 | * | 9/2018 | Driker | F16J 15/3232 |
| 10,393,491 B2 | * | 8/2019 | Meyer | G01B 5/0004 |
| 2022/0228847 A1 | * | 7/2022 | Nutzinger | G01B 5/02 |

FOREIGN PATENT DOCUMENTS

| | | | | |
|---|---|---|---|---|
| DE | 20022027 U1 | 2/2002 | | |
| EP | 0348660 A2 | 1/1990 | | |
| EP | 3279615 A1 | * 2/2018 | ............. | G01B 21/16 |
| EP | 3293495 A1 | 3/2018 | | |
| EP | 3904837 A1 | * 11/2021 | ............... | G01B 5/02 |
| JP | 2001174247 A | 6/2001 | | |

\* cited by examiner

*Primary Examiner* — John Fitzgerald
*Assistant Examiner* — Tania Courson
(74) *Attorney, Agent, or Firm* — LEYDIG, VOIT & MAYER, LTD.

(57) ABSTRACT

A position-measuring device includes a housing having a first portion in the form of a hollow section and extending in a longitudinal direction. The housing includes at least a first passage and a second passage, the first and second passages each extending in the longitudinal direction at least partially through the first portion. A scale is disposed within the housing for being scanned as part of a position measurement. The position-measuring device includes a connecting channel, the first and second passages being interconnected via the connecting channel.

20 Claims, 16 Drawing Sheets

POSITION-MEASURING DEVICE

CROSS-REFERENCE TO PRIOR APPLICATIONS

Priority is claimed to European Patent Application No. 20171972.1, filed on Apr. 29, 2020, the entire disclosure of which is hereby incorporated by reference herein.

FIELD

The present invention relates to a position-measuring device.

BACKGROUND

JP 2001 174 247 A describes a position-measuring device, particularly a length-measuring device. The position-measuring device includes a housing having a hollow section extending in a longitudinal direction, a scale disposed within the housing, and a scanning unit for scanning the scale. The housing has a plurality of passages serving as cooling channels. The passages each extend in the longitudinal direction through the hollow section.

It is a disadvantage of the known position-measuring device that a temperature distribution of a cooling medium flowing through the passages is not homogeneous over the length of the scale. Therefore, it is not possible to achieve optimum cooling of the scale. As a result, the accuracy of the position measurement is reduced or at least not maintained as compared to an optimum cooling of the scale.

SUMMARY

In an embodiment, the present invention provides a position-measuring device. The position-measuring device comprises a housing having a first portion in the form of a hollow section and extending in a longitudinal direction. The housing includes at least a first passage and a second passage, the first and second passages each extending in the longitudinal direction at least partially through the first portion. A scale is disposed within the housing for being scanned as part of a position measurement. The position-measuring device includes a connecting channel, the first and second passages being interconnected via the connecting channel.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1A:
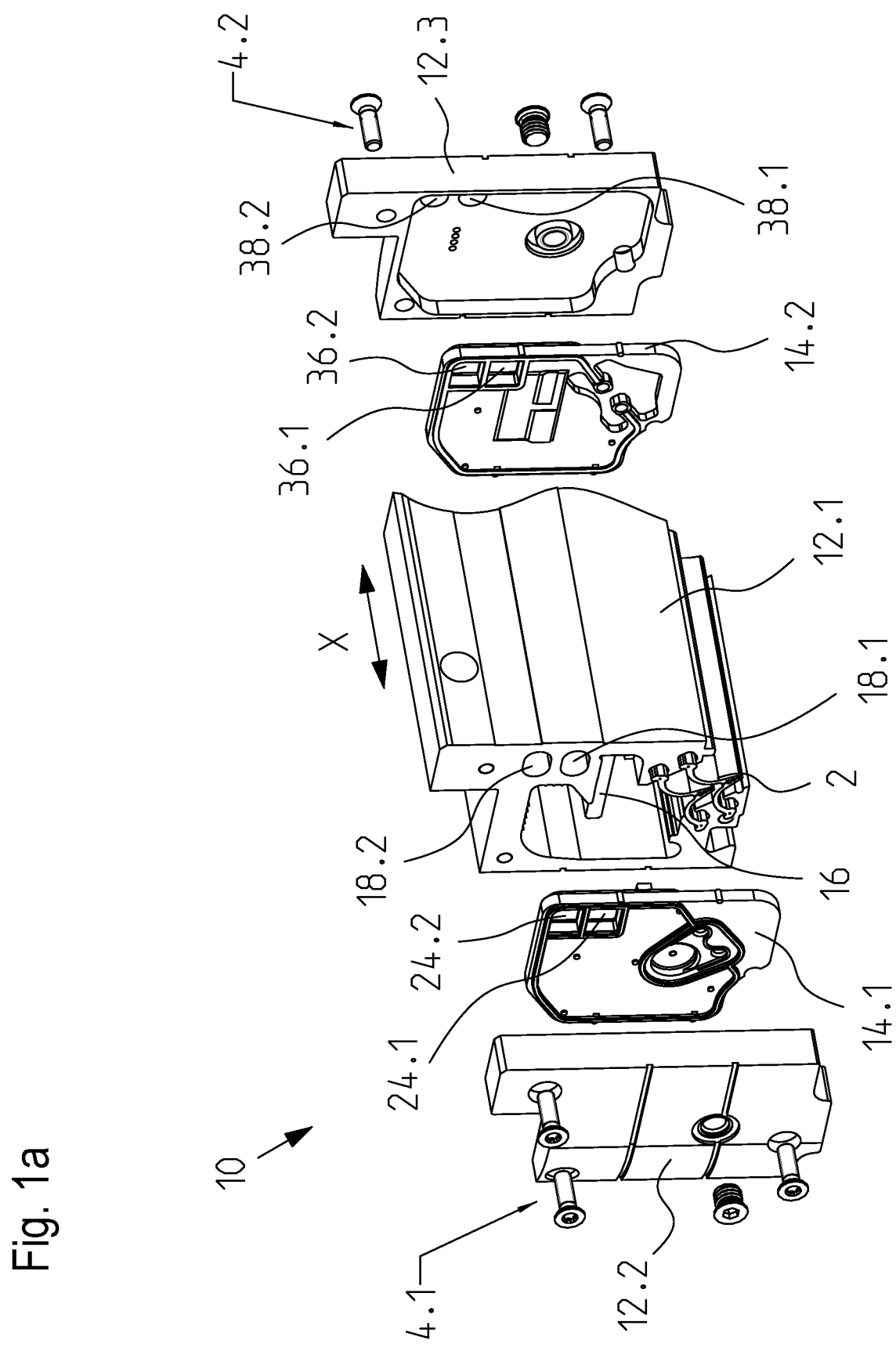
FIG. 1a is a perspective exploded view of a position-measuring device according to a first exemplary embodiment.
Figure 1B:
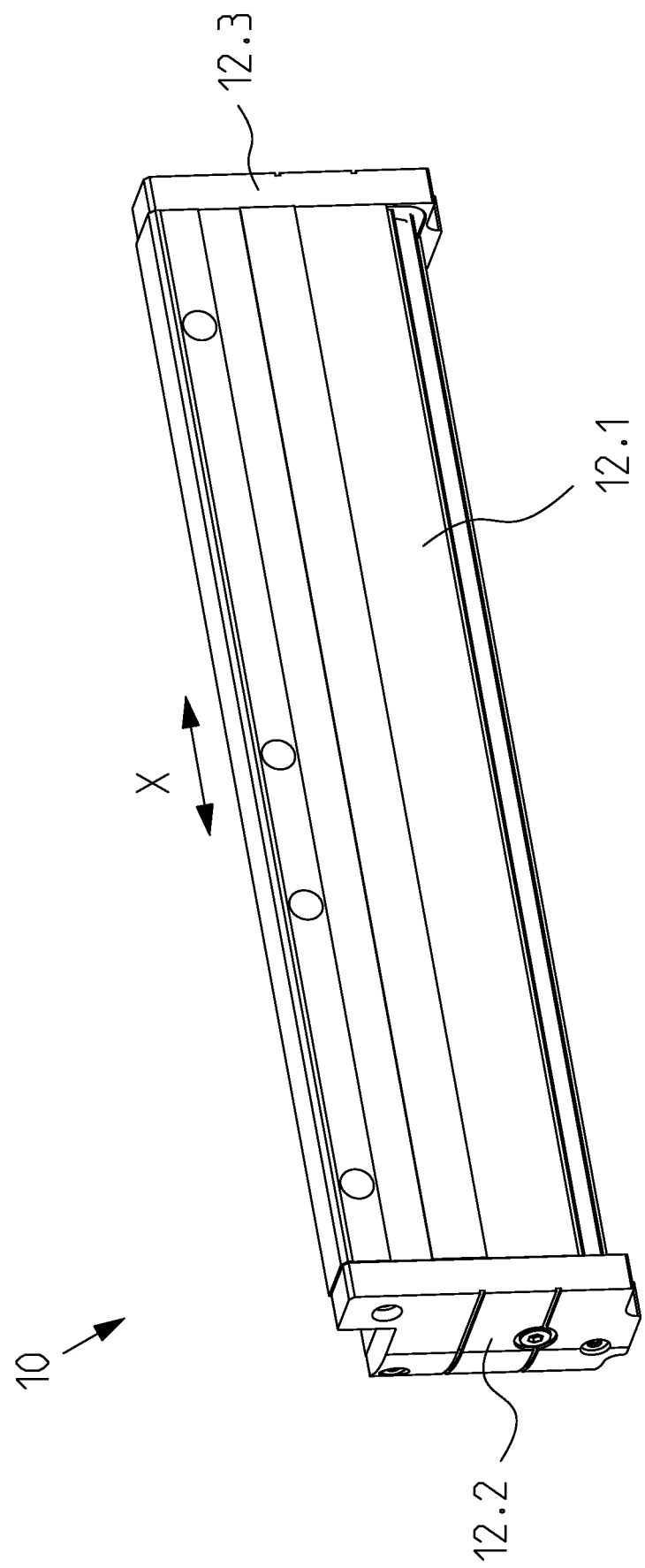
FIG. 1b is a perspective view of the position-measuring device according to the first exemplary embodiment.

In an embodiment, the present invention provides a position-measuring device that permits accurate position measurement in the longitudinal direction of a scale disposed within a housing of the position-measuring device.

The position-measuring device designed in accordance with an embodiment of the invention includes a housing having a first portion in the form of a hollow section and extending in a longitudinal direction, a scale disposed within the housing, and a scanning unit for scanning the scale. The housing has at least a first passage and a second passage. The two passages each extend in the longitudinal direction at least partially through the first portion. The position-measuring device has a connecting channel. The two passages are interconnected via the connecting channel.

Preferably, the connecting channel serves as a fluidic connection between cross sections of the two passages.

The connecting channel extends in particular between a cross section of the first passage and a cross section of the second passage.

It is advantageous if the connecting channel is configured such that a fluid flowing through a cross section of the first passage in a first direction parallel to the longitudinal direction is redirected such that, after redirection, it flows through a cross section of the second passage in a second direction opposite to the first direction.

Preferably, the connecting channel is formed by structures within a cap element and/or within a sealing element. These structures include in particular a recess as well as passages.

Furthermore, the position-measuring device may have a U-shaped redirecting element. The redirecting element has an inlet or outlet opening associated with the first passage and an inlet or outlet opening associated with the second passage.

By means of embodiments of the invention, a homogeneous temperature distribution of the cooling medium (fluid) is achieved over the length of the scale. This in turn permits accurate position measurement in the longitudinal direction of the scale. For this purpose, in particular, the connecting channel is provided as a fluidic connection for redirecting the fluid at one end of the position-measuring device. The first passage and the second passage preferably serve as cooling channels to produce a fluid flow flowing in the first direction and in the second direction (i.e., in opposite directions). It is also advantageous if the port arrangement for the inlet (fluid inlet means) and for the outlet (fluid discharge means) is provided at the other end of the position-measuring device. This also allows for easy installation of the fluid inlet means and the fluid discharge means for connection to a cooling circuit and enables a compact design; i.e., a reduction in the space required for the position-measuring device.

Preferably, the port arrangement for the fluid inlet means and for the fluid discharge means is provided at only one end, in particular a freely selectable end, of the position-measuring device.

The first passage and the second passage may also be referred to as cooling bores.

A "first viewing direction" is hereinafter understood to be the viewing direction toward the first portion. A "second viewing direction" is hereinafter understood to be the viewing direction away from the first portion.

In the Figures, identical or functionally identical elements are denoted by the same reference numerals.

A first exemplary embodiment will now be described with reference to FIGS. 1a through 2h. The position-measuring device according to the first exemplary embodiment includes a housing 10 having a first portion 12.1 in the form of a hollow section and extending in a longitudinal direction X, a scale 16 disposed within housing 10, and a scanning unit for scanning scale 16. The scanning unit is not shown in the figures.

The position-measuring device is in particular a length-measuring device. For this purpose, scale 16 and the scanning unit are movable relative to each other in longitudinal direction X (i.e., the measurement direction). During position measurement, the scanning unit scans a measuring graduation of scale 16 and generates position measurement values therefrom. The measuring graduation is not shown in the figures.

First portion 12.1 has sealing lips 2 extending in longitudinal direction X. Extending through sealing lips 2 is a drive dog (not shown in the figures) to which the scanning unit is attached. Housing 10 has a second portion 12.2 disposed at one end of first portion 12.1. Furthermore, housing 10 has a third portion 12.3 disposed at the other end of first portion 12.1. Second portion 12.2 and third portion 12.3 are each cap elements. The position-measuring device further has a first sealing element 14.1. First sealing element 14.1 is disposed between first portion 12.1 and second portion 12.2. In addition, the position-measuring device has a second sealing element 14.2. Second sealing element 14.2 is disposed between first portion 12.1 and third portion 2.3. First sealing element 14.1 and second sealing element 14.2 are each plate-shaped and serve to seal housing 10. Second portion 12.2 is attachable by screws 4.1 to the one end of first portion 12.1. Furthermore, third portion 12.3 is attachable by screws 4.2 to the other end of first portion 12.1.

Housing 10 has a first passage 18.1 and a second passage 18.2. The two passages 18.1, 18.2 are arranged one above the other and each extend in longitudinal direction X completely through first portion 12.1; i.e., from one end to the other end (see FIGS. 2b and 2f). The two passages 18.1, 18.2 serve as cooling channels (i.e., channels for a cooling medium) to provide optimum cooling of scale 16.

Figure 2A:
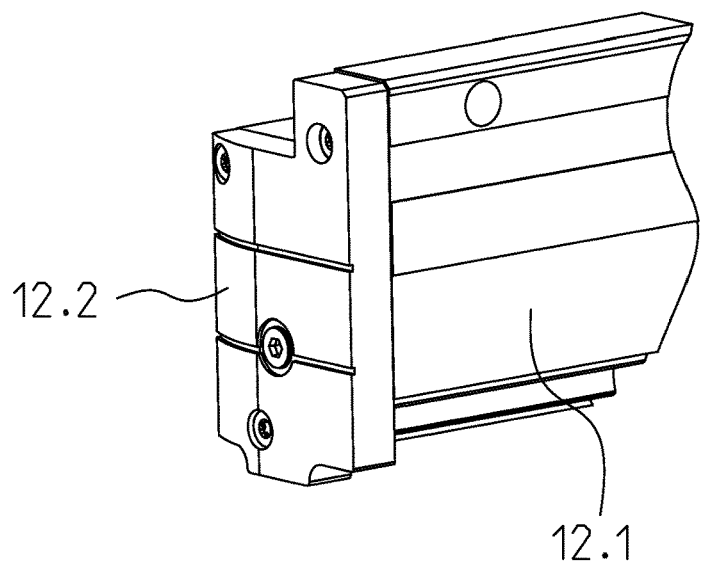
FIG. 2a is a perspective view of one end of the position-measuring device according to the first exemplary embodiment.
Figure 2B:
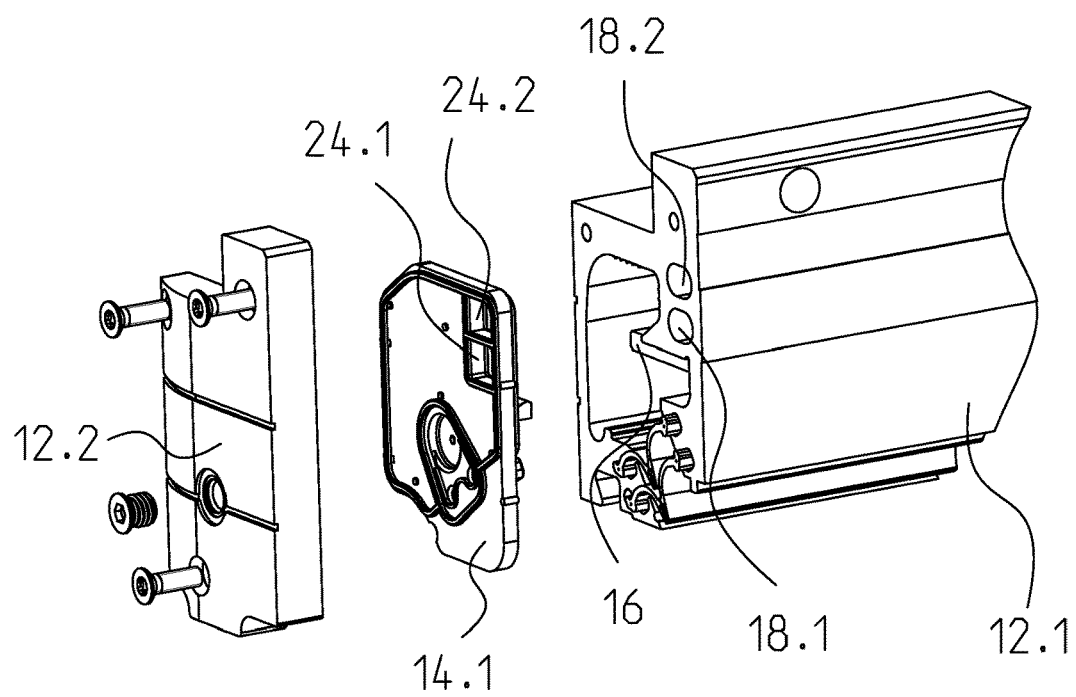
FIG. 2b is a perspective exploded view showing the first end of the position-measuring device according to the first exemplary embodiment in a first viewing direction.
Figure 2C:
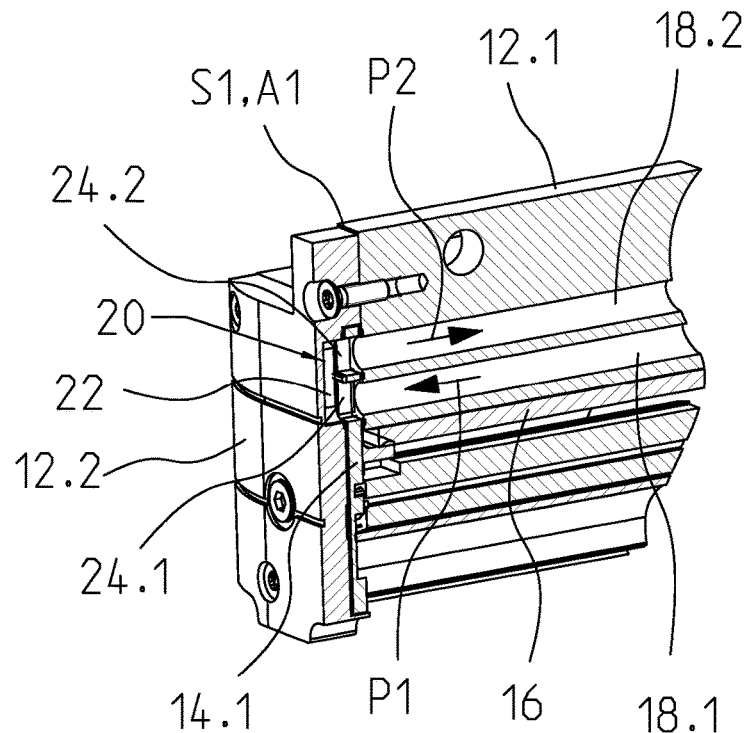
FIG. 2c is a perspective sectional view of the first end of the position-measuring device according to the first exemplary embodiment.
Figure 2D:
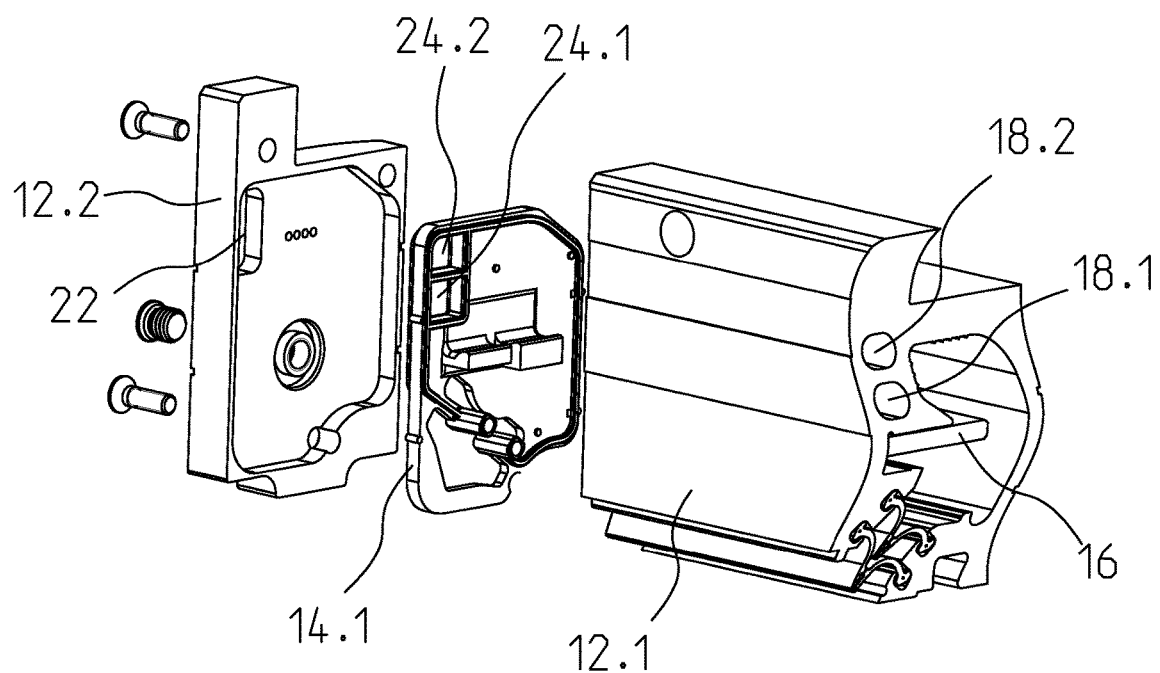
FIG. 2d is a perspective exploded view showing the first end of the position-measuring device according to the first exemplary embodiment in a second viewing direction.
Figure 2E:
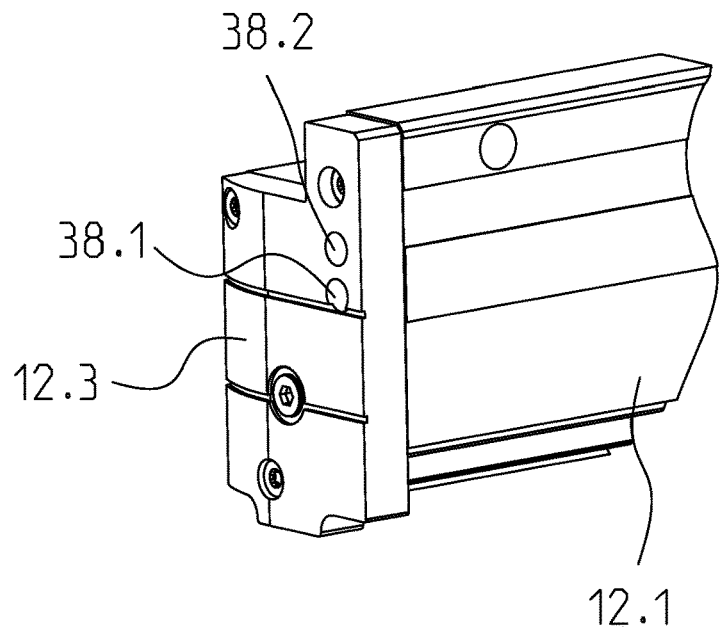
FIG. 2e is a perspective view of a second end of the position-measuring device according to the first exemplary embodiment.

The position-measuring device further has a connecting channel 20 (see FIG. 2c). The two passages 18.1, 18.2 are interconnected via connecting channel 20. Connecting channel 20 extends between a cross section of first passage 18.1 and a cross section of second passage 18.2. Connecting channel 20 is configured such that a fluid flowing through a cross section of first passage 18.1 in a first direction P1 parallel to longitudinal direction X is redirected such that, after redirection, it flows through a cross section of second passage 18.2 in a second direction P2 opposite to first direction P1. In this way, a counter-current flow can be produced; i.e., fluid flow in the two opposite directions P1, P2. This results in a homogeneous temperature distribution of the cooling medium over the length of scale 16, and thus in accurate position measurement in longitudinal direction X of scale 16.

The two passages 18.1, 18.2 each extend to a plane S1 extending perpendicular to longitudinal direction X. Plane S1 coincides with an end surface A1 of the one end of first portion 12.1. This is shown in FIG. 2c.

Second portion 12.2 has a recess 22 associated with both first passage 18.1 and second passage 18.2. That is, recess 22 and the two passages 18.1, 18.2 face each other in longitudinal direction X. Recess 22 is readily visible in FIG. 2d.

Furthermore, first sealing element 14.1 has a passage 24.1 associated with first passage 18.1 and a passage 24.2 associated with second passage 18.2. That is, the two passages 24.1, 24.2 each face a respective one of the two passages 18.1, 18.2 in the longitudinal direction X. The two passages 24.1, 24.2 are readily visible in FIGS. 2b and 2d.

As illustrated in FIG. 2c, connecting channel 20 is formed by the two passages 24.1, 24.2 and recess 22. Connecting channel 20 serves to provide a fluidic connection between cross sections (i.e., the cross sections in plane S1) of the two passages 18.1, 18.2.

Figure 2F:
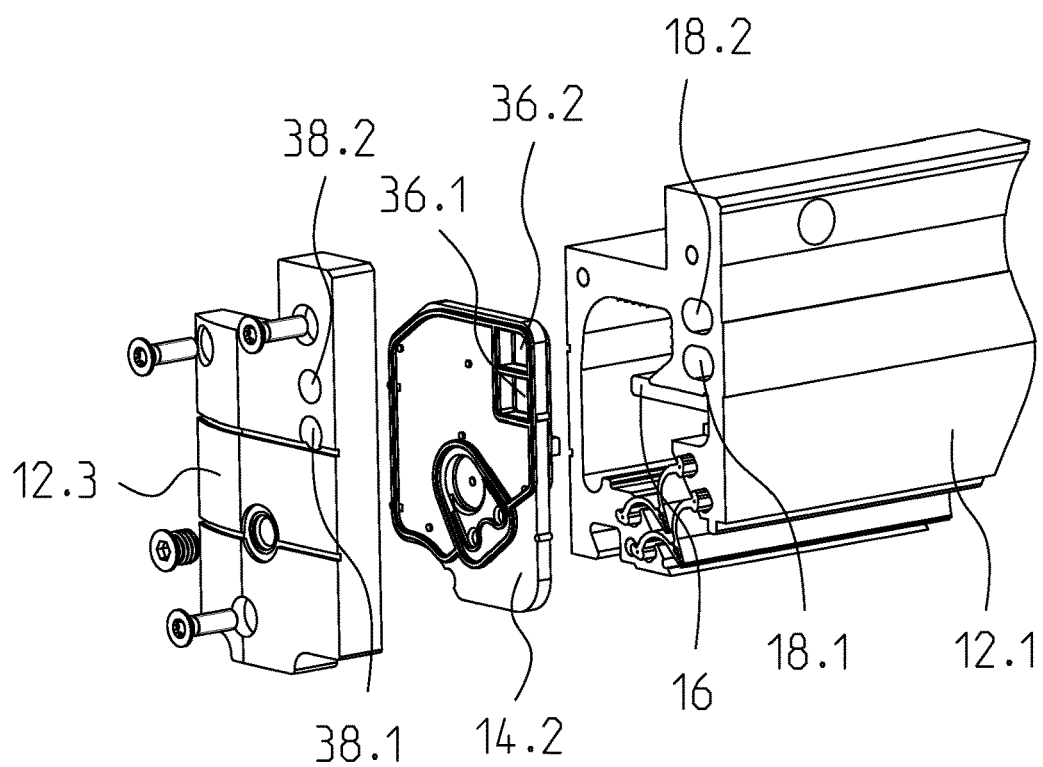
FIG. 2f is a perspective exploded view showing the second end of the position-measuring device according to the first exemplary embodiment in a first viewing direction.
Figure 2G:
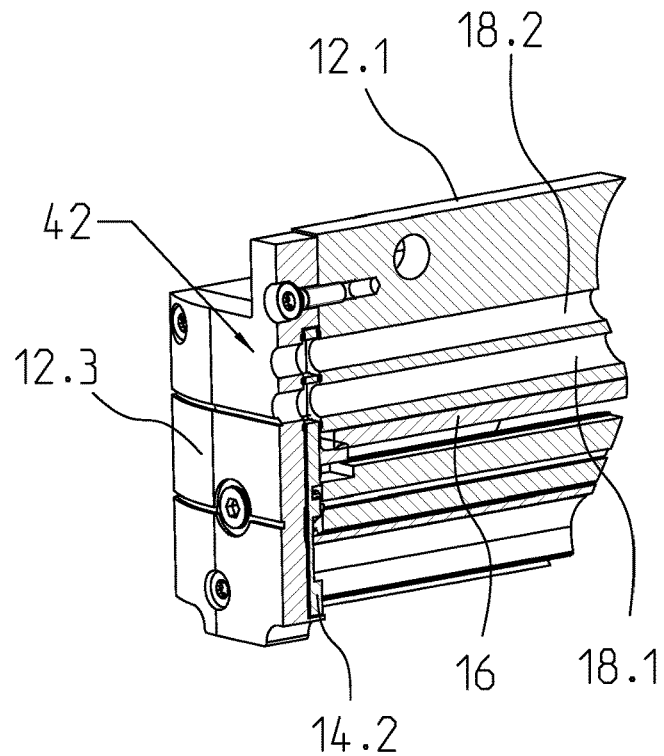
FIG. 2g is a perspective sectional view of the second end of the position-measuring device according to the first exemplary embodiment.
Figure 2H:
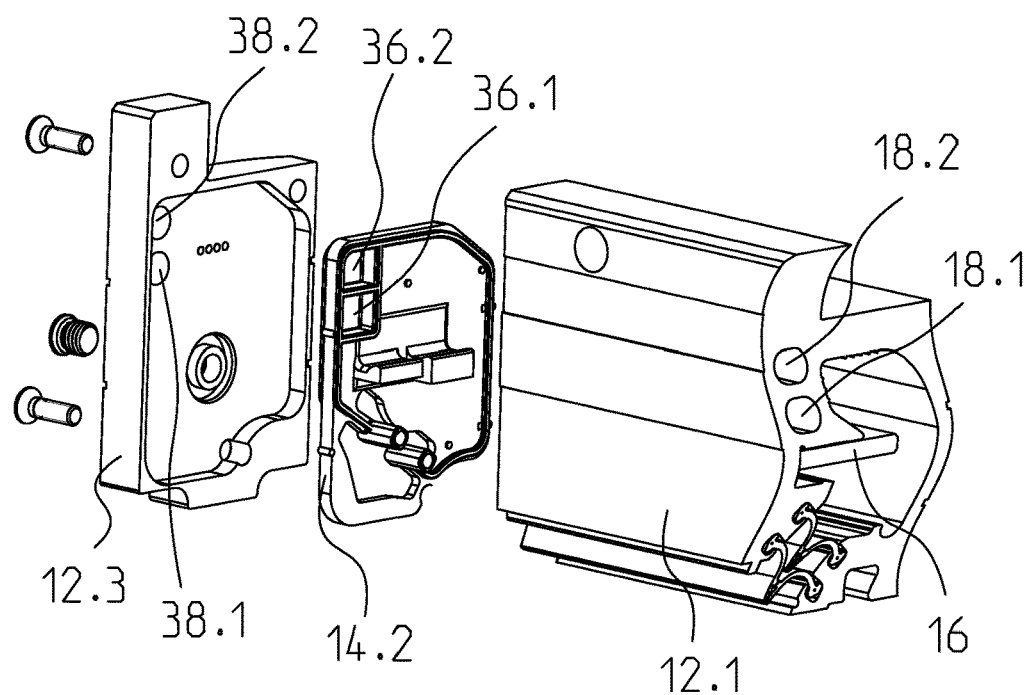
FIG. 2h is a perspective exploded view showing the second end of the position-measuring device according to the first exemplary embodiment in a second viewing direction.

In order to provide the port arrangement for the fluid inlet means and for the fluid discharge means, second sealing element 14.2 has a passage 36.1 associated with first passage 18.1 and a passage 36.2 associated with second passage 18.2. Furthermore, third portion 12.3 has a passage 38.1 associated with first passage 18.1 and a passage 38.2 associated with second passage 18.2. As illustrated in FIG. 2f, the two passages 36.1, 36.2 each face a respective one of the two passages 18.1, 18.2 in longitudinal direction X. Furthermore, the two passages 38.1, 38.2 each face a respective one of the two passages 36.1, 36.2 and a respective one of the two passages 18.1, 18.2 in longitudinal direction X. The port arrangement 42 formed by the two passages 36.1, 36.2 and the two passages 38.1, 38.2 is depicted in FIG. 2g. Port arrangement 42 is disposed at the other end of first portion 12.1.

Figure 3A:
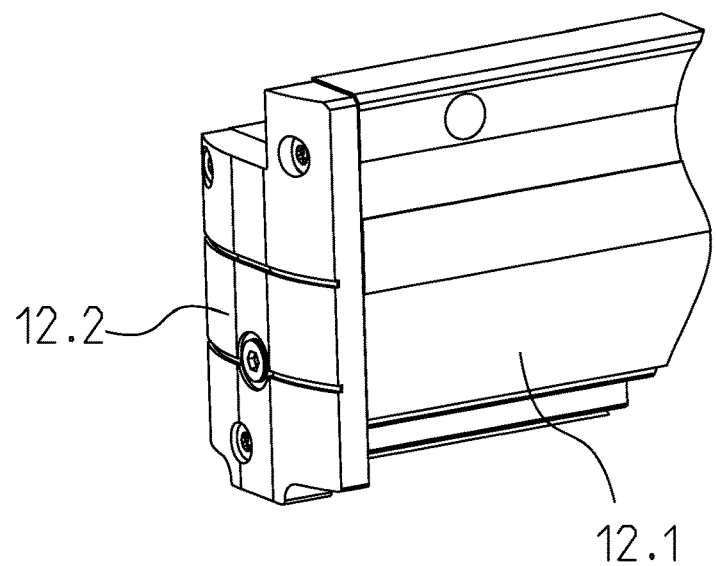
FIG. 3a is a perspective view of a first end of a position-measuring device according to a second exemplary embodiment.
Figure 3B:
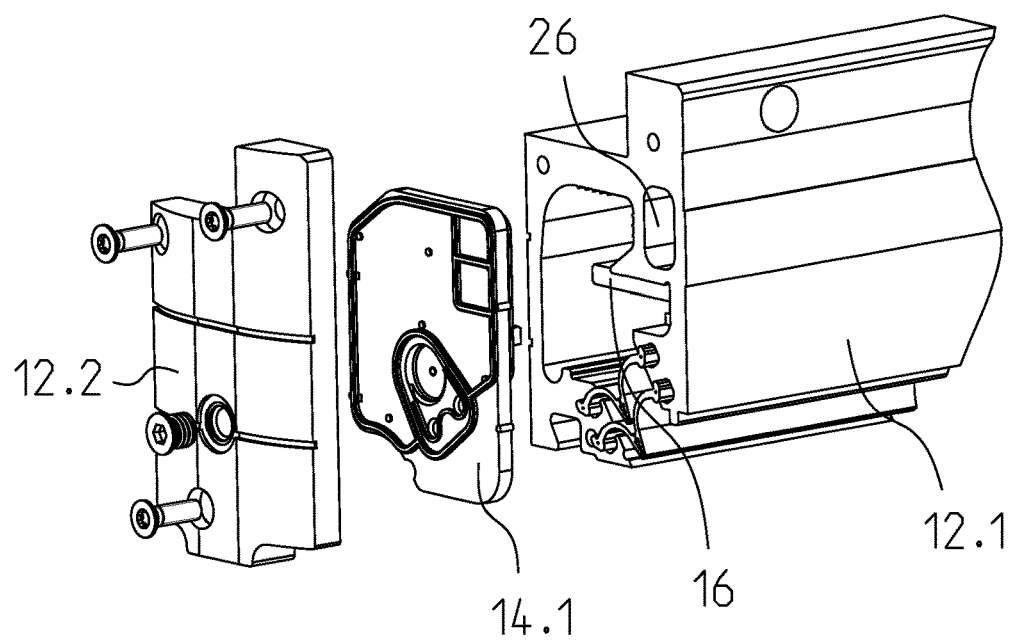
FIG. 3b is a perspective exploded view showing the first end of the position-measuring device according to the second exemplary embodiment in a first viewing direction.
Figure 3C:
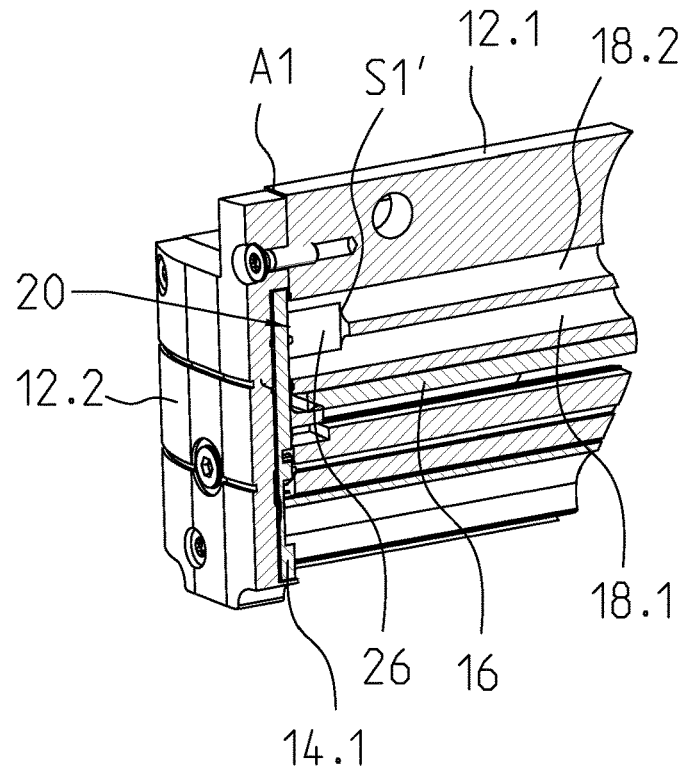
FIG. 3c is a perspective sectional view of the first end of the position-measuring device according to the second exemplary embodiment.

FIGS. 3a through 3d show different views of a first end (redirecting end) of a position-measuring device according to a second exemplary embodiment. The position-measuring device according to the second exemplary embodiment differs from the position-measuring device according to the first exemplary embodiment in that the two passages 18.1, 18.2 each extend only partially through first portion 12.1 in longitudinal direction X. As illustrated in FIG. 3c, the two passages 18.1, 18.2 each extend to a plane S1' extending perpendicular to longitudinal direction X. Plane S1' is offset in longitudinal direction X from end surface A1 of the one end of first portion 12.1. First portion 12.1 further has a recess 26 adjacent to first passage 18.1 and to second passage 18.2 (see FIGS. 3b and 3c).

Figure 3D:
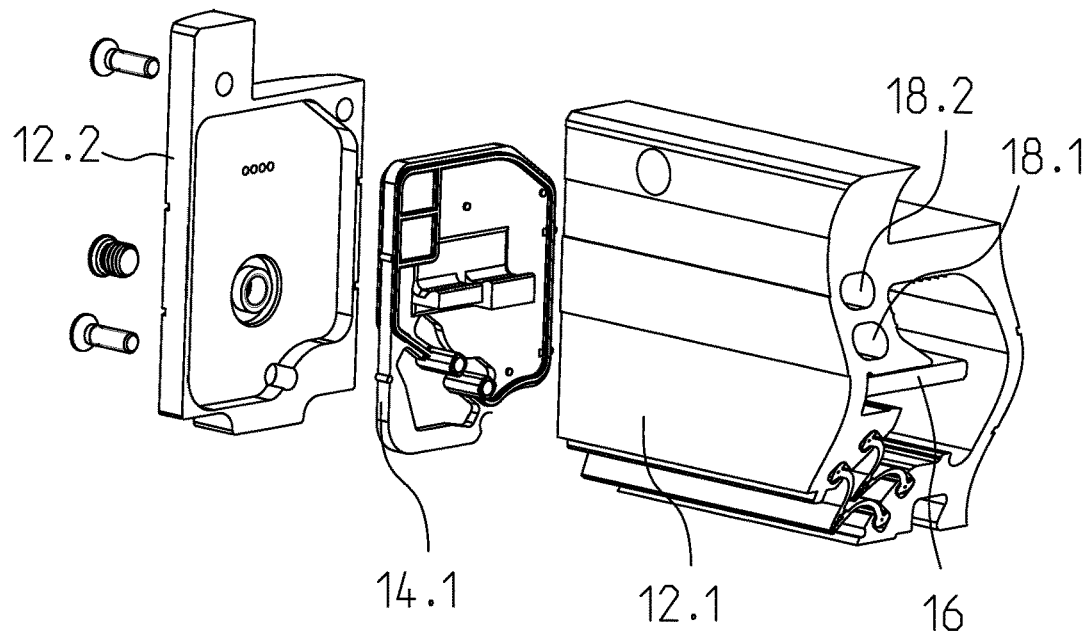
FIG. 3d is a perspective exploded view showing the first end of the position-measuring device according to the second exemplary embodiment in a second viewing direction.

In addition, referring to FIG. 3d, second portion 12.2 has a continuous shape at least in a region associated with first passage 18.1 and with second passage 18.2; i.e., a region located opposite thereto in longitudinal direction X. Further referring to FIG. 3d, first sealing element 14.1 has a continuous shape at least in a region associated with first passage 18.1 and with second passage 18.2; i.e., a region located opposite thereto in longitudinal direction X. In this connection, "having a continuous shape" means that the region does not have a recess and/or passages.

As illustrated in FIG. 3c, connecting channel 20 is formed by recess 26. Recess 26 extends from plane SP to plane A1.

Plane A1 coincides with an end surface of first sealing element 14.1 facing first portion 12.1.

Figure 4A:
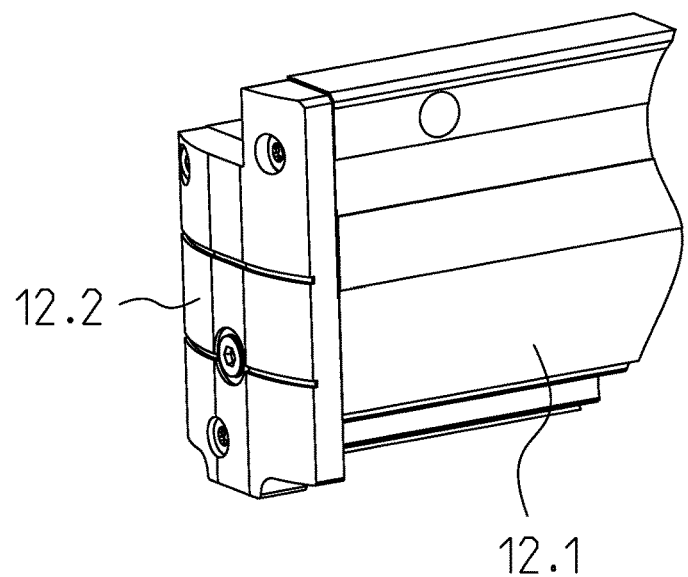
FIG. 4a is a perspective view of a first end of a position-measuring device according to a third exemplary embodiment.
Figure 4B:
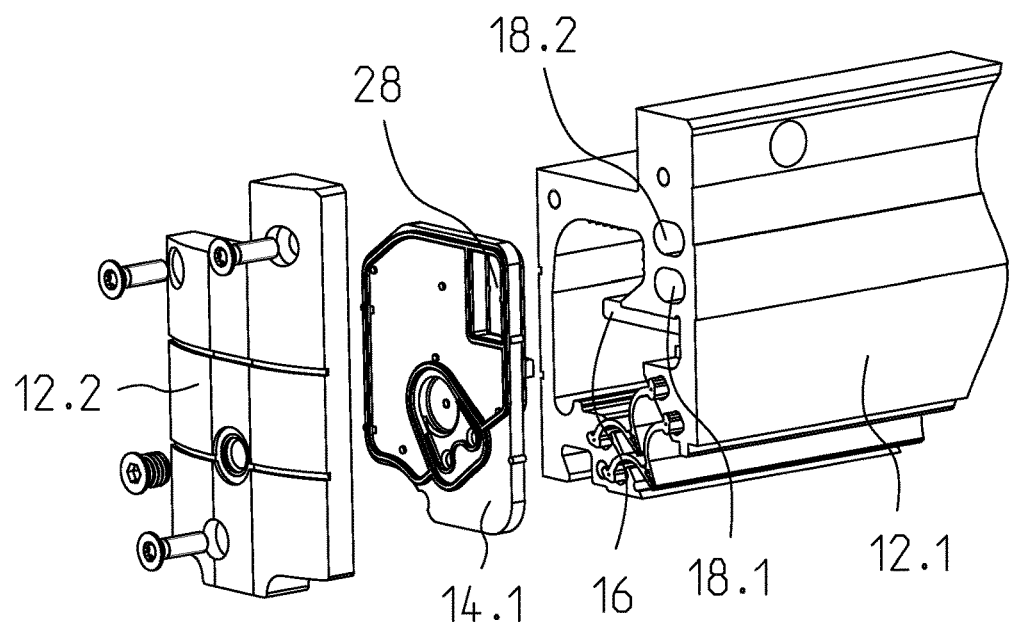
FIG. 4b is a perspective exploded view showing the first end of the position-measuring device according to the third exemplary embodiment in a first viewing direction.
Figure 4C:
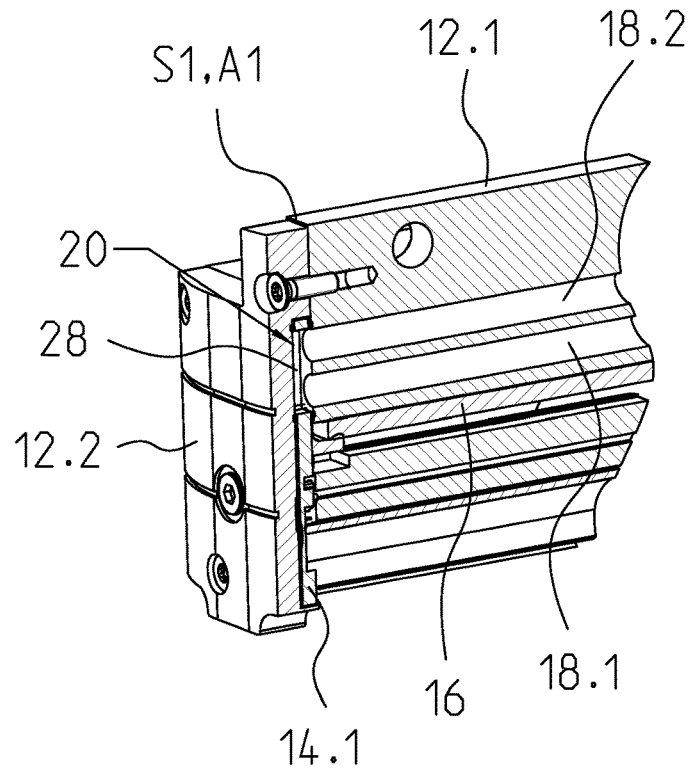
FIG. 4c is a perspective sectional view of the first end of the position-measuring device according to the third exemplary embodiment.
Figure 4D:
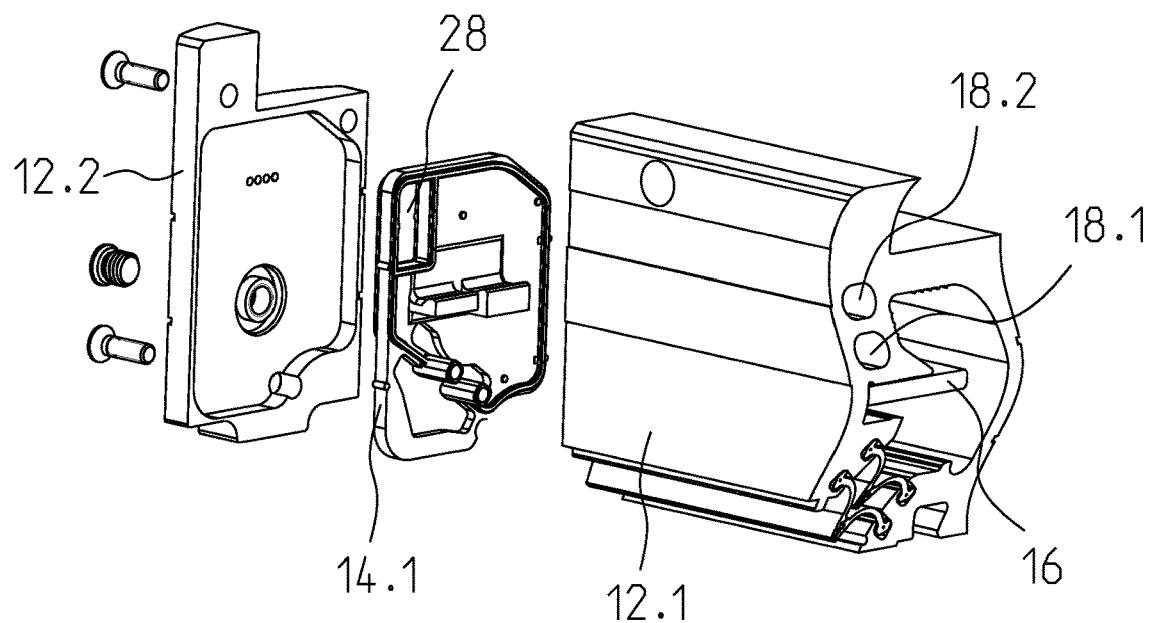
FIG. 4d is a perspective exploded view showing the first end of the position-measuring device according to the third exemplary embodiment in a second viewing direction.

FIGS. 4a through 4d show different views of a first end (redirecting end) of a position-measuring device according to a third exemplary embodiment. The position-measuring device according to the third exemplary embodiment differs from the position-measuring device according to the first exemplary embodiment in that first sealing element 14.1 has a recess 28 associated with both first passage 18.1 and second passage 18.2. As illustrated in FIGS. 4b and 4d, recess 28 extends in longitudinal direction X completely through first sealing element 14.1. Furthermore, second portion 12.2 has a continuous shape at least in a region associated with first passage 18.1 and with second passage 18.2; i.e., a region located opposite thereto in longitudinal direction X. In this connection, "having a continuous shape" means that the region does not have a recess and/or a passage.

As illustrated in FIG. 4c, connecting channel 20 is formed by recess 28. Recess 28 extends from plane S1 or A1 to an (inner) end surface of second portion 12.2 facing first portion 12.1. The inner end surface of second portion 12.2 is offset in longitudinal direction X from plane S1 or A1.

Figure 5A:
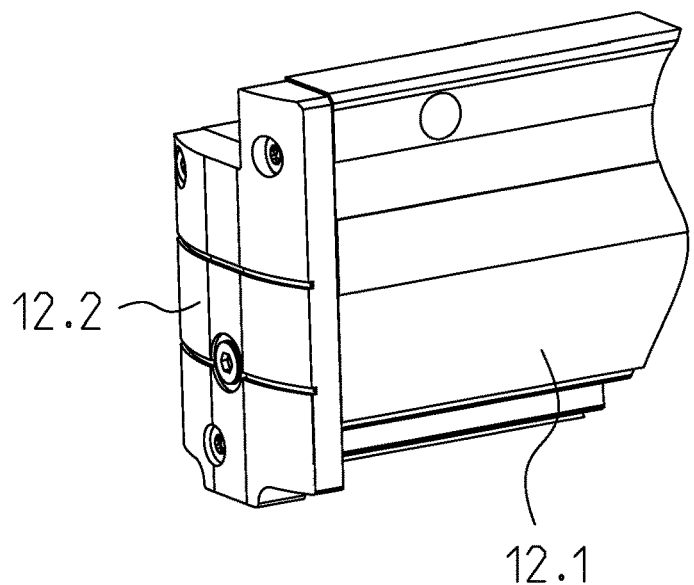
FIG. 5a is a perspective view of a first end of a position-measuring device according to a fourth exemplary embodiment.
Figure 5B:
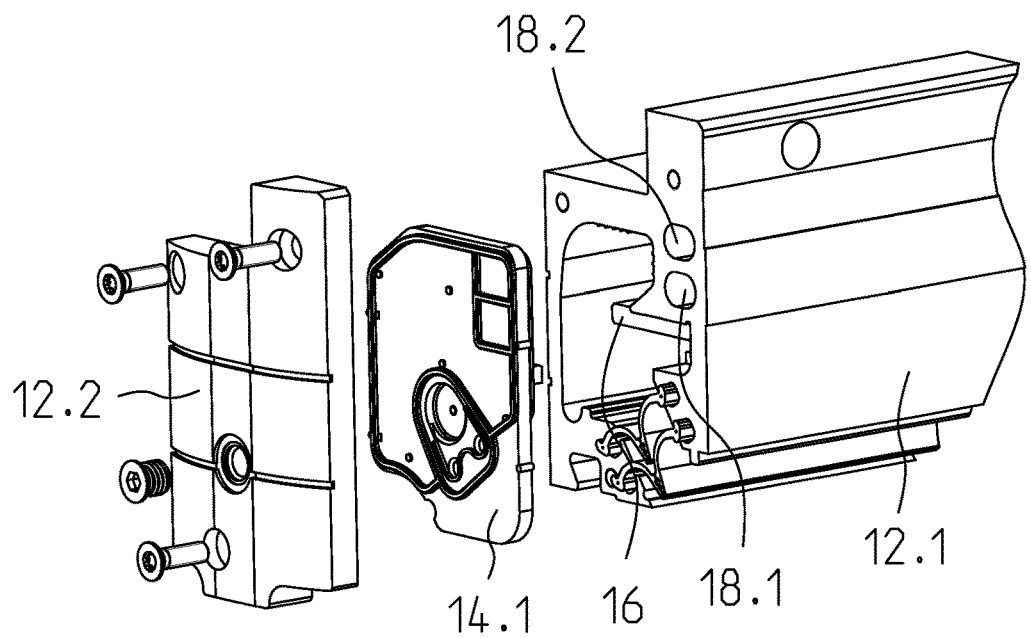
FIG. 5b is a perspective exploded view showing the first end of the position-measuring device according to the fourth exemplary embodiment in a first viewing direction.
Figure 5C:
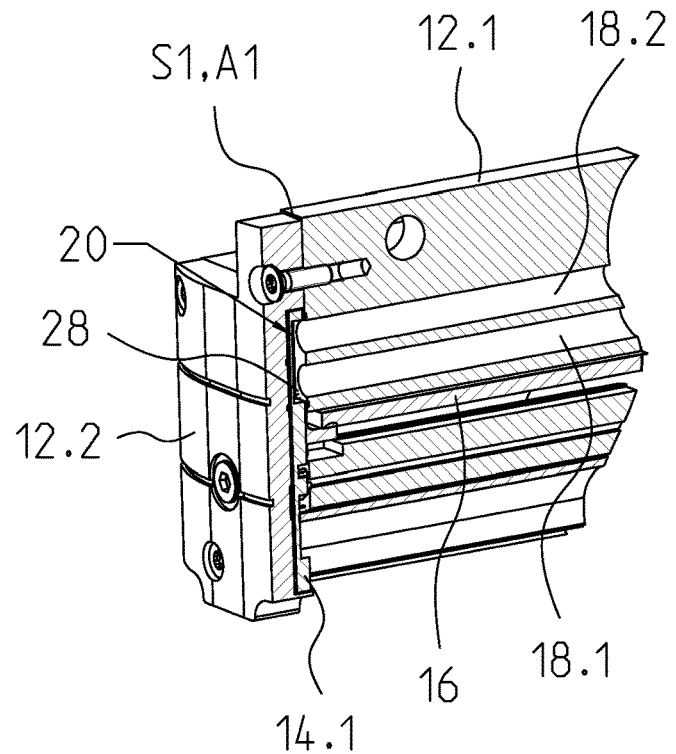
FIG. 5c is a perspective sectional view of the first end of the position-measuring device according to the fourth exemplary embodiment.
Figure 5D:
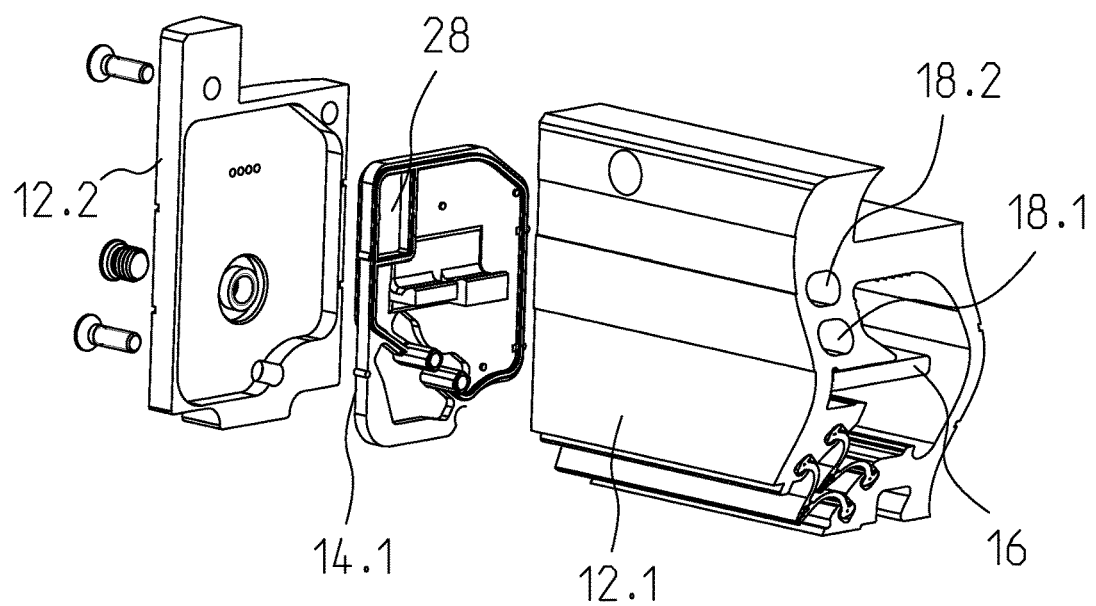
FIG. 5d is a perspective exploded view showing the first end of the position-measuring device according to the fourth exemplary embodiment in a second viewing direction.

FIGS. 5a through 5d show different views of a first end (redirecting end) of a position-measuring device according to a fourth exemplary embodiment. The position-measuring device according to the fourth exemplary embodiment differs from the position-measuring device according to the first exemplary embodiment in that first sealing element 14.1 has a recess 28 associated with both first passage 18.1 and second passage 18.2. As illustrated in FIGS. 5b and 5d, recess 28 extends in longitudinal direction X only partially through first sealing element 14.1. Furthermore, second portion 12.2 has a continuous shape at least in a region associated with first passage 18.1 and with second passage 18.2; i.e., a region located opposite thereto in longitudinal direction X. In this connection, "having a continuous shape" means that the region does not have a recess and/or a passage.

As illustrated in FIG. 5c, connecting channel 20 is formed by recess 28. Recess 28 extends from plane S1 or A1 to an (inner) end surface of sealing element 14.1 facing first portion 12.1. The inner end surface of first sealing element 14.1 is offset in longitudinal direction X from plane S1 or A1.

Figure 6A:
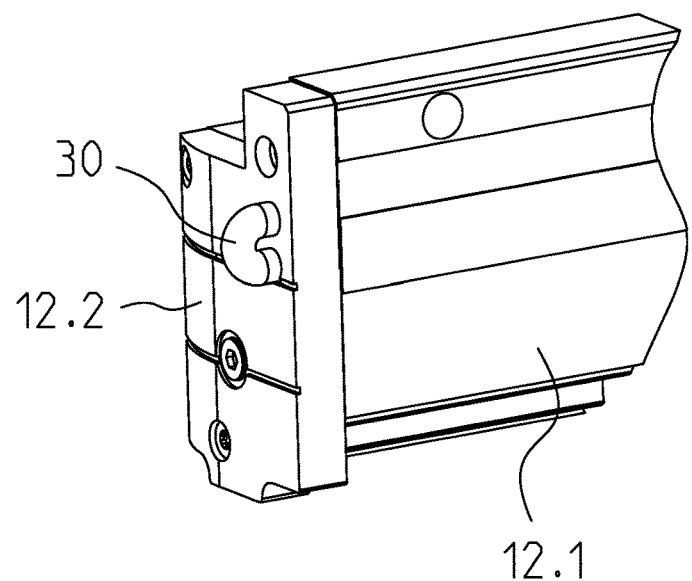
FIG. 6a is a perspective view of a first end of a position-measuring device according to a fifth exemplary embodiment.
Figure 6B:
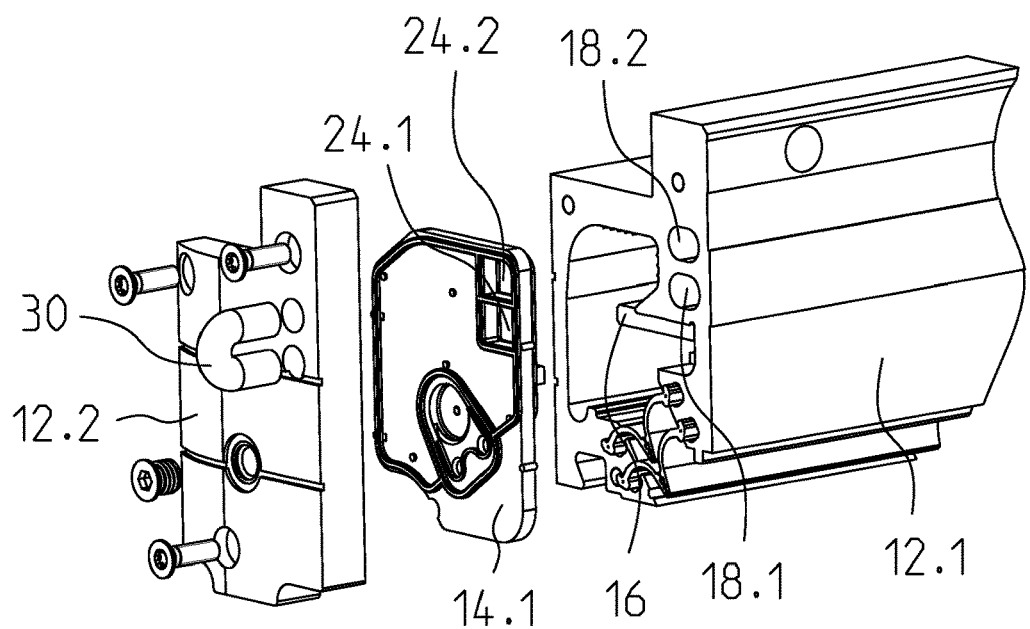
FIG. 6b is a perspective exploded view showing the first end of the position-measuring device according to the fifth exemplary embodiment in a first viewing direction.
Figure 6C:
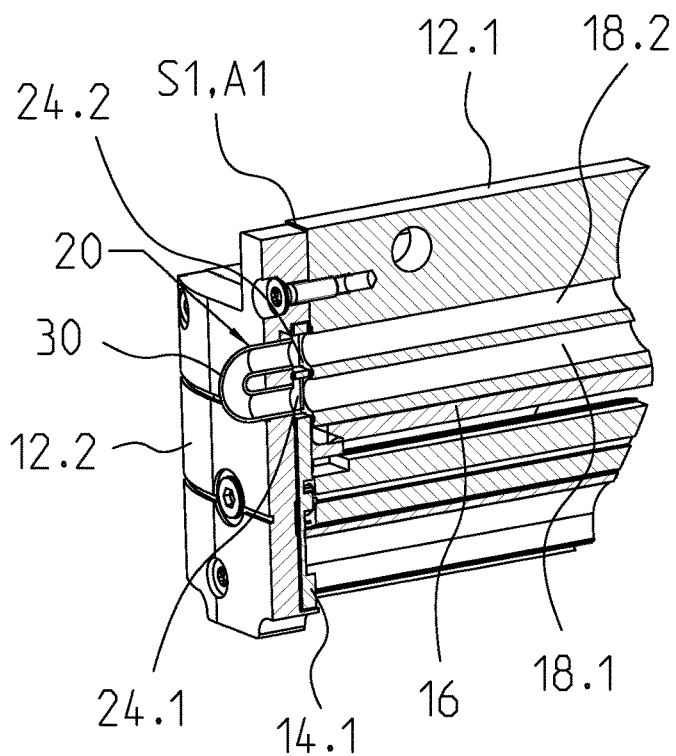
FIG. 6c is a perspective sectional view of the first end of the position-measuring device according to the fifth exemplary embodiment.
Figure 6D:
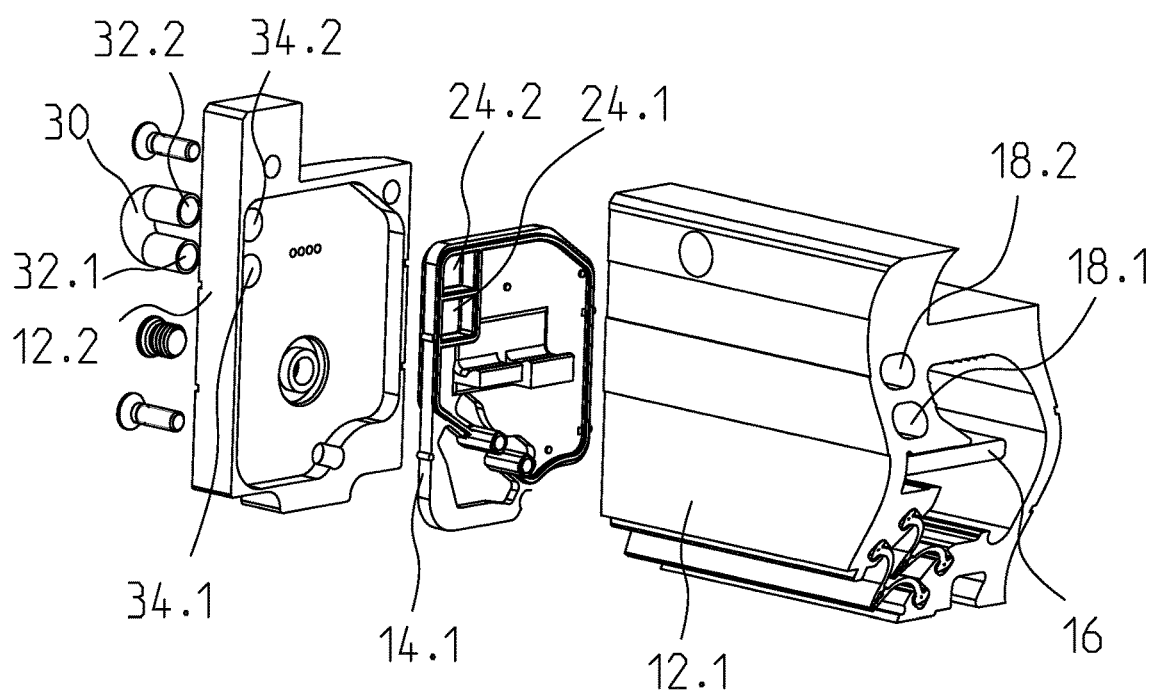
FIG. 6d is a perspective exploded view showing the first end of the position-measuring device according to the fifth exemplary embodiment in a second viewing direction.
Figure 7A:
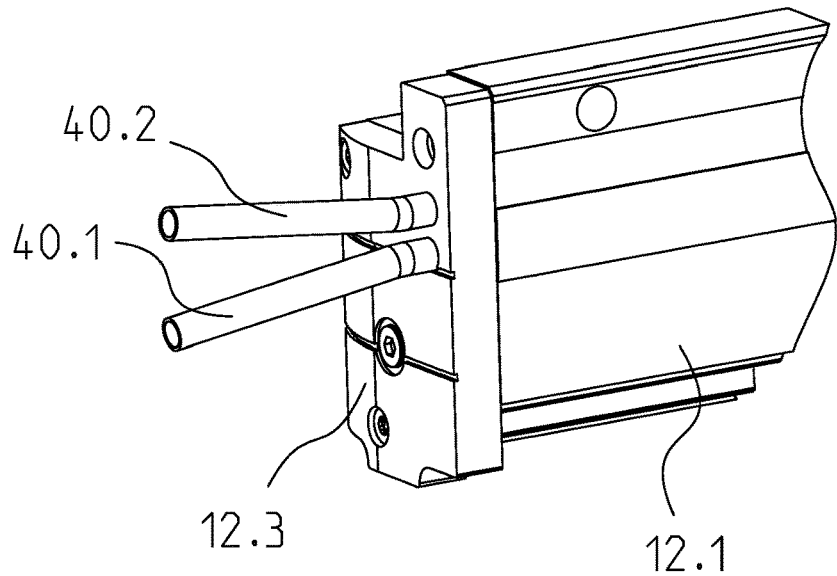
FIG. 7a is a perspective view of a second end of the position-measuring device according to any of the first through fifth exemplary embodiments.
Figure 7B:
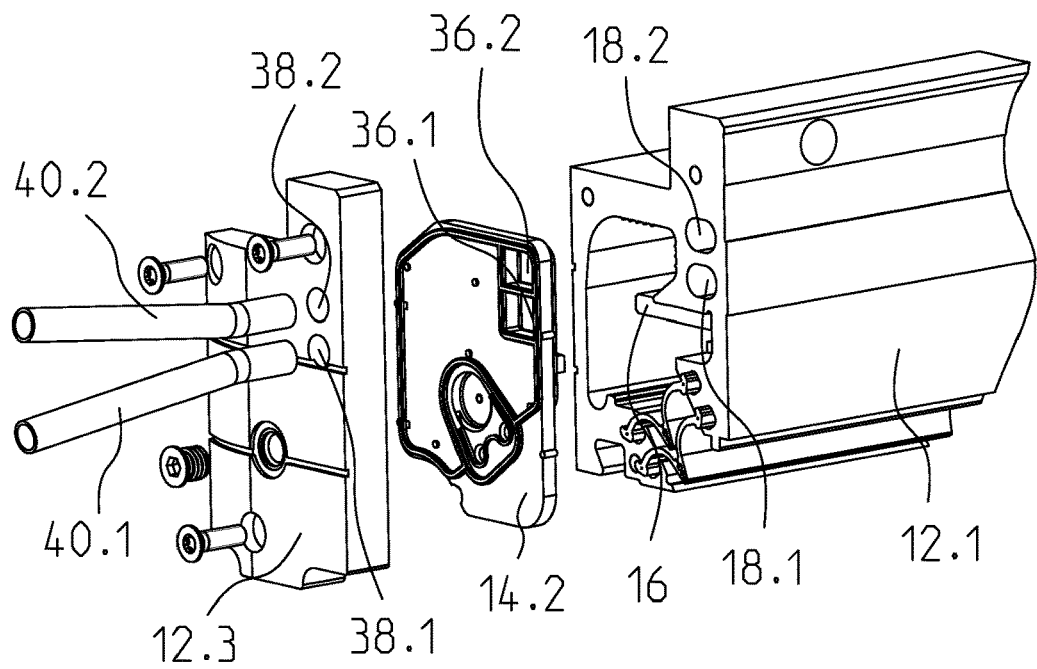
FIG. 7b is a perspective exploded view showing the second end of the position-measuring device according to any of the first through fifth exemplary embodiments in a first viewing direction.
Figure 7C:
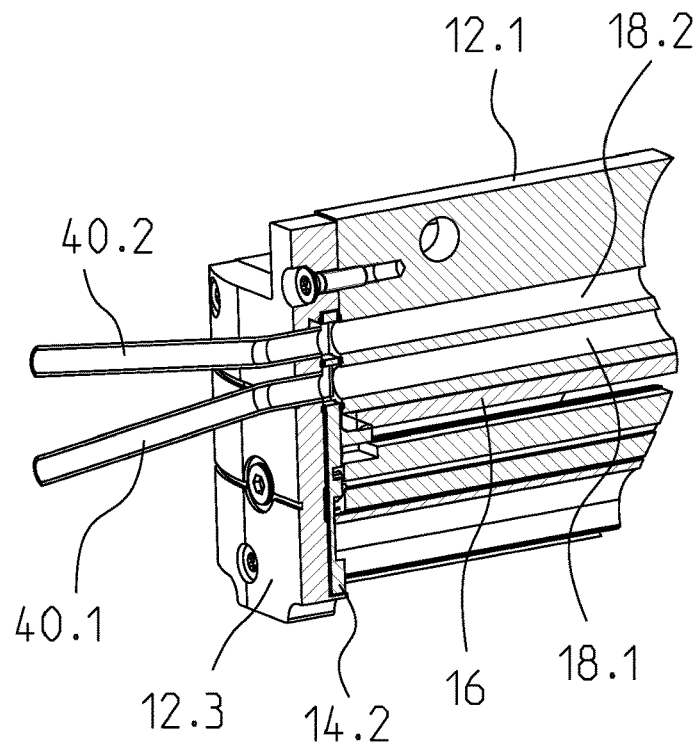
FIG. 7c is a perspective sectional view of the second end of the position-measuring device according to any of the first through fifth exemplary embodiments.
Figure 7D:
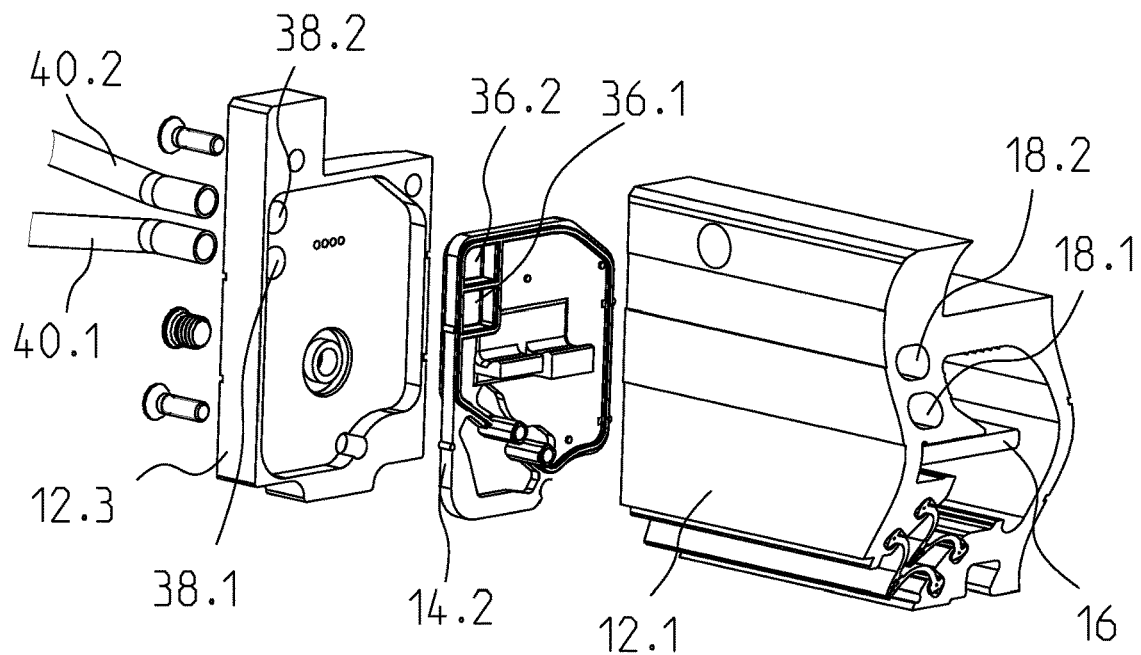
FIG. 7d is a perspective exploded view showing the second end of the position-measuring device according to any of the first through fifth exemplary embodiments in a second viewing direction.

FIGS. 6a through 6d show different views of a first end (redirecting end) of a position-measuring device according to a fifth exemplary embodiment. The position-measuring device according to the fifth exemplary embodiment differs from the position-measuring device according to the first exemplary embodiment in that second portion 12.2 has a passage 34.1 associated with first passage 18.1 and a passage 34.2 associated with second passage 18.2. The two passages 34.1, 34.2 each face a respective one of the two passages 18.1, 18.2 in longitudinal direction X. Furthermore, the position-measuring device has a U-shaped redirecting element 30. Redirecting element 30 has an inlet or outlet opening 32.1 associated with first passage 18.1 and an inlet or outlet opening 32.2 associated with second passage 18.2. As illustrated in FIG. 6c, connecting channel 20 is formed by the two passages 24.1, 24.2 formed in first sealing element 14.1 and the redirecting element 30 inserted into the two passages 34.1, 34.2 of second portion 12.2. Redirecting element 30 extends in longitudinal direction X beyond second portion 12.2.

FIGS. 7a through 7d show different views of a second end (port end) of the position-measuring device according to any of the first through fifth exemplary embodiments. The position-measuring device's second end shown in FIGS. 7a through 7d corresponds in particular to that shown in FIG. 1a. As illustrated in FIGS. 7a through 7d, the second end of the position-measuring device may have a first fluid inlet or discharge means 40.1 and a second fluid inlet or discharge means 40.2. First fluid inlet or discharge means 40.1 is associated with first passage 18.1. Second fluid inlet or discharge means 40.2 is associated with second passage 18.2. The connected state of first and second fluid inlet or discharge means 40.1, 40.2 is shown, in particular, in FIG. 7c. The connection of the position-measuring device to a cooling circuit is accomplished via first and second fluid inlet or discharge means 40.1, 40.2.

First and second fluid inlet or discharge means 40.1, 40.2 each take the form of, for example, a connecting hose.

First fluid inlet or discharge means 40.1 is preferably a fluid inlet means. Second fluid inlet or discharge means 40.2 is preferably a fluid discharge means. Thus, fluid inlet means 40.1 and fluid discharge means 40.2 may advantageously be disposed at only one end (the same end) of the position-measuring device. Redirection of the fluid flow may then take place at the other end of the position-measuring device; i.e., the opposite end in longitudinal direction X.

In all exemplary embodiments, more than two passages may be provided which each extend in the longitudinal direction at least partially through first portion 12.1. In this case, the position-measuring device may have a plurality of connecting channels via which the passages are interconnected in pairs.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A position-measuring device, comprising:
   a housing having a first portion in the form of a hollow section and extending in a longitudinal direction, the housing having at least a first passage and a second passage, the first and second passages each extending in the longitudinal direction at least partially through the first portion;
   a scale disposed within the housing for being scanned as part of a position measurement; and
   a connecting channel, the first and second passages being interconnected via the connecting channel, wherein the connecting channel is configured such that a fluid flowing through a cross section of the first passage in a first direction parallel to the longitudinal direction is redirected such that, after redirection, the fluid flows through a cross section of the second passage in a second direction opposite to the first direction.

2. The position-measuring device as recited in claim 1, wherein the connecting channel extends between a cross section of the first passage and a cross section of the second passage.

3. The position-measuring device as recited in claim 1, wherein the first and second passages each extend to a plane extending perpendicular to the longitudinal direction, the plane coinciding with an end surface of one end of the first portion.

4. The position-measuring device as recited in claim 1, wherein the position-measuring device has a U-shaped redirecting element, the redirecting element having an inlet or outlet opening associated with the first passage and an inlet or outlet opening associated with the second passage.

5. The position-measuring device according to claim 1, wherein the scale extends along the longitudinal direction.

6. The position-measuring device according to claim 1, wherein the first and second passage each have a closed cross-section and are configured to allow for passage of a fluid along the longitudinal direction therethrough.

7. The position-measuring device as recited in claim 1, wherein the first and second passages each extend to a plane extending perpendicular to the longitudinal direction, the plane being offset in the longitudinal direction from an end surface of one end of the first portion.

8. The position-measuring device as recited in claim 7, wherein the first portion has a recess adjacent to the first passage and to the second passage.

9. The position-measuring device as recited in claim 1, wherein the housing has a second portion disposed at one end of the first portion, the second portion being a cap element.

10. The position-measuring device as recited in claim 9, wherein the second portion has a recess associated with the first passage and with the second passage.

11. The position-measuring device as recited in claim 9, wherein the second portion has a continuous shape at least in a region associated with the first passage and with the second passage.

12. The position-measuring device as recited in claim 9, wherein the second portion has a passage associated with the first passage and a passage associated with the second passage.

13. The position-measuring device as recited in claim 9, wherein the position-measuring device has a first sealing element, the first sealing element being disposed between the first portion and the second portion.

14. The position-measuring device as recited in claim 13, wherein the first sealing element has a passage associated with the first passage and a passage associated with the second passage.

15. The position-measuring device as recited in claim 13, wherein the first sealing element has a continuous shape at least in a region associated with the first passage and with the second passage.

16. The position-measuring device as recited in claim 13, wherein the first sealing element has a recess associated with the first passage and with the second passage, the recess extending in the longitudinal direction at least partially through the first sealing element.

17. A position-measuring device, comprising:
- a housing having a first portion in the form of a hollow section and extending in a longitudinal direction, the housing having at least a first passage and a second passage, the first and second passages each extending in the longitudinal direction at least partially through the first portion;
- a scale disposed within the housing for being scanned as part of a position measurement; and
- a connecting channel, the first and second passages being interconnected via the connecting channel, wherein the first and second passages each extend to a plane extending perpendicular to the longitudinal direction, the plane coinciding with, or being offset in the longitudinal direction from, an end surface of one end of the first portion.

18. The position-measuring device as recited in claim 17, wherein the plane coincides with the end surface of one end of the first portion.

19. The position-measuring device as recited in claim 17, wherein the plane is offset in the longitudinal direction from the end surface of one end of the first portion.

20. A position-measuring device, comprising:
- a housing having a first portion in the form of a hollow section and extending in a longitudinal direction, the housing having at least a first passage and a second passage, the first and second passages each extending in the longitudinal direction at least partially through the first portion, wherein the housing has a second portion disposed at one end of the first portion, the second portion being a cap element;
- a scale disposed within the housing for being scanned as part of a position measurement;
- a connecting channel, the first and second passages being interconnected via the connecting channel; and
- a first sealing element being disposed between the first portion and the second portion, wherein the first sealing element has a recess associated with the first passage and with the second passage, the recess extending in the longitudinal direction at least partially through the first sealing element.

* * * * *